United States Patent [19]

Smith

[11] Patent Number: 5,095,747
[45] Date of Patent: Mar. 17, 1992

[54] CRYOGENIC LIQUID LEVEL SENSING APPARATUS

[75] Inventor: Dennis H. Smith, Dubuque, Iowa

[73] Assignee: Barnstead Thermolyne Corporation, Dubuque, Iowa

[21] Appl. No.: 456,937

[22] Filed: Dec. 26, 1989

[51] Int. Cl.$^5$ .................................... G01F 23/28
[52] U.S. Cl. ............................ 73/290 V; 340/621; 364/571.07
[58] Field of Search ................ 73/295, 290 V; 364/571.07; 340/621

[56] References Cited

U.S. PATENT DOCUMENTS

| | | |
|---|---|---|
| 2,960,678 | 11/1960 | Beard et al. |
| 3,170,094 | 2/1965 | Roth. |
| 3,184,969 | 5/1965 | Bolton. |
| 3,237,451 | 3/1966 | Haeff. |
| 3,266,311 | 8/1966 | Andreasen et al. |
| 3,361,897 | 1/1968 | Rush ..................... 364/571.07 X |
| 3,540,275 | 11/1970 | Post et al. .................. 73/290 V |
| 3,745,829 | 7/1973 | Franchi. |
| 4,114,441 | 9/1978 | Magri. |
| 4,121,094 | 10/1978 | Divito et al. |
| 4,183,007 | 1/1980 | Baird. |
| 4,210,969 | 7/1980 | Massa. |
| 4,221,004 | 9/1980 | Combs et al. |
| 4,400,976 | 8/1983 | Blades. |
| 4,470,299 | 9/1984 | Soltz. |
| 4,487,066 | 12/1984 | Pardi et al. .................. 364/509 X |
| 4,535,627 | 8/1985 | Prost et al. |
| 4,675,854 | 6/1987 | Lau. |
| 4,700,569 | 10/1987 | Michalski et al. |
| 4,704,902 | 11/1987 | Doshi. |
| 4,821,569 | 4/1989 | Soltz. |
| 4,850,213 | 7/1989 | Steinebrunner et al. ......... 73/290 V |

*Primary Examiner*—Daniel M. Yasich
*Attorney, Agent, or Firm*—Marjama & Pincelli

[57] ABSTRACT

Method and apparatus for measuring the level of a cryogenic liquid in a container using frequency pulses. The time interval between the transmitted and echoed pulse is measured and compared with predetermined store values which are characteristics of the container of known geometry.

20 Claims, 4 Drawing Sheets

CRYOGENIC LIQUID LEVEL SENSING APPARATUS

The present invention is directed to a liquid level sensing apparatus, and more particularly, to an apparatus for sensing the level of a cryogenic liquid.

BACKGROUND OF THE INVENTION

Within the diverse fields of laboratory research, cryogenic vessels filled with liquid nitrogen are employed in the storage of biological samples until such time as the laboratory technologist is ready to process or further diagnose the samples. These vessels typically are comprised of an inner enclosure, surrounded by an evacuated outer enclosure, and a cover. The vessel structure minimizes the evaporation of the liquid nitrogen into the surrounding room. Because the covers are not perfectly sealed, leakage still exists, and the liquid nitrogen has to be periodically replenished. There exists the distinct need to know the level of the liquid in the vessel at all times so as to refill the vessel on a timely basis so as to avoid the biological sample from being exposed. It is also desirable to avoid wasting liquid nitrogen as the specimen is transferred to laboratory storage vessels.

A variety of level sensing apparatuses have been suggested in the prior art to appropriately monitor the level of a cryogenic liquid in a vessel so as to provide the user with an indication that the vessel is low or empty. One approach taken in the prior art is through the use of temperature based systems, implying resistant temperature devices and thermistors to detect the temperature differential of the liquid and gas. However, such contact-type sensor devices have two very basic problems. First, these type devices are limited to indicating a particular level and are thus not capable of monitoring the various levels that may be present within the vessel. Additionally, these type devices, due to their fragile nature, are subject to thermal shock. Further, such devices are usually based upon a difference in the resistivity of the sensor. The temperature difference from liquid to gas is so small that sometimes it does not produce a sufficient shift in the sensor resistivity to record an accurate change.

In the prior art there has also been suggested the use of ultrasonic-type sensors, in a contact and non-contact mode. U.S. Pat. No. 3,266,311 is an example of a cryogenic level indicator of the basically go/no-go type, which merely detects the presence or absence of the liquid nitrogen at a specific point in the depth of the storage vessel. U.S. Pat. No. 3,170,094 also discloses a go/no-go type device.

There also has been suggested in the prior art the use of multiple sensors to accomplish the continuous analog indication of depth of the liquid. An example of such prior art is illustrated by U.S. Pat. Nos. 2,960,678 and 4,400,936. However, these systems rely on multiple sensors to provide this output reading which, of course, results in additional costs to the system, and in cryogenic applications, would mean significant loss of the storage medium.

Another problem encountered with the liquid level detection system of the prior art is that of system calibration. U.S. Pat. Nos. 3,184,969; 4,210,969; 4,221,004; and 4,470,299 require additional costly hardware components which would be medium wasting in a liquid nitrogen environment and electric circuitry is needed to provide a suitable means of calibration of the system to accommodate for changes in internal vessel pressure and temperature. Other prior art systems failed to easily alert the user to various systems fault conditions. In addition to providing the level indication, very little is done with regard to recognizing such conditions as a fracture of vessel, unstable levels and low level.

Applicants have invented an improved cryogenic level detecting apparatus. An apparatus made in accordance with the present invention incorporates a non-contact single ultrasonic transducer which is strategically positioned in insulation within the vessel which provides a consistent noise-free measurement. The apparatus of the present invention also provides an analog indication of the depth of the liquid. Further, the apparatus according to the present invention, has done away with the need for system recalibration and provides various alerts for numerous fault conditions.

SUMMARY OF THE INVENTION

In one aspect of the invention there is provided an apparatus for measuring the level of a cryogenic liquid in a container of known geometry. Means are provided for transmitting and receiving frequency pulses for a duration of time required to travel to the surface and return. Measuring means are provided for detecting the time interval between the transmitted pulse and echoed pulse. Means are also provided to compare the internal time measured with a predetermined store tank of values which are characteristics of the level of liquid in the container.

In another aspect of the present invention, there is provided a method of measuring the level of a cryogenic liquid in a container of a known geometry, comprising the steps of:

a) transmitting ultrasonic waves at the liquid within the container;

b) monitoring the time interval between the transmitted pulse and echoed pulse; and c) comparing the time measured with predetermined values stored in memory which are characteristic of the level of the liquid for the known geometry of the container.

DETAILED DESCRIPTION OF THE DRAWINGS

Figure 1:
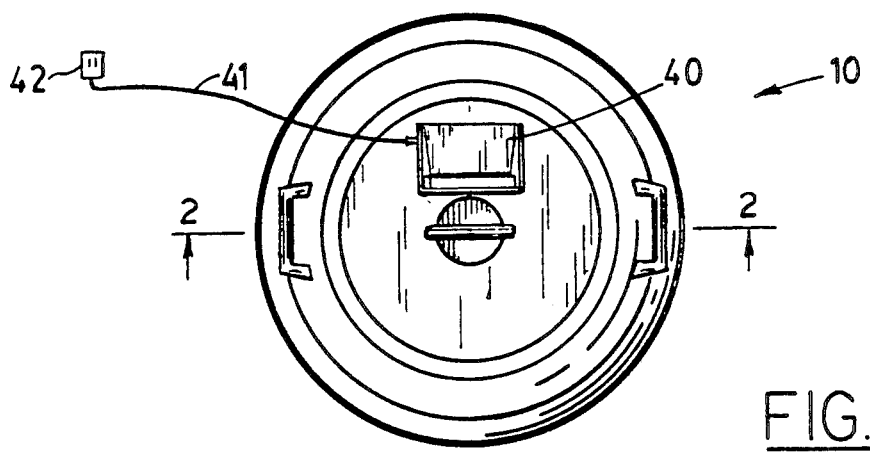
Referring to FIG. 1, there is illustrated a top plan view of an apparatus made in accordance with the present invention.
Figure 2:
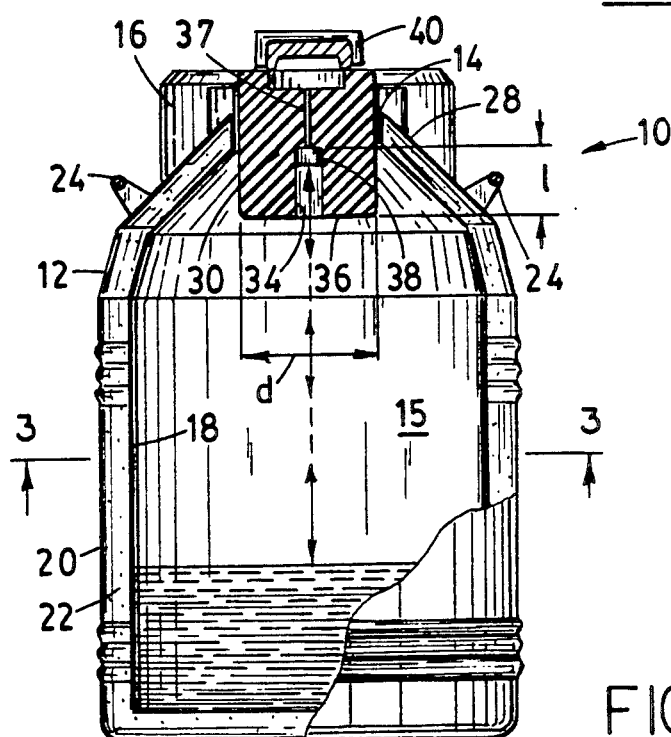
FIG. 2 is a cross-sectional view partially broken away as taken along line 2—2 of FIG. 1.
Figure 3:
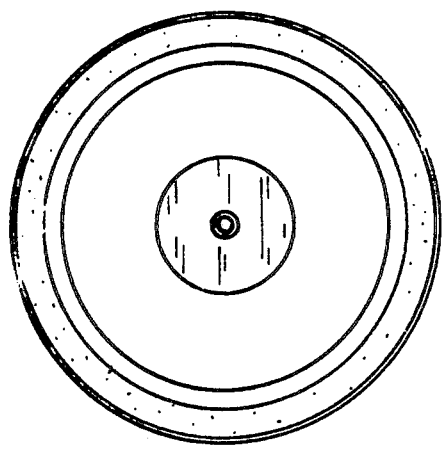
FIG. 3 is a bottom plan view of the upper interior portion of the apparatus of FIG. 2 taken along line 3—3.
Figure 5:
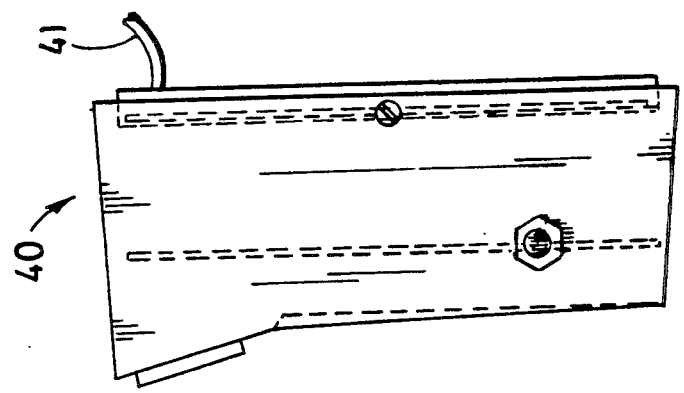
FIG. 5 is a side elevational view of the control unit of FIG. 5.

Referring to FIGS. 1-5, there is illustrated a liquid level sensing apparatus 10 made in accordance with the present invention. The apparatus includes a containment vessel 12 having an access opening 14 at the top thereof which leads to an interior cryogenic storage chamber 15 and a cover 16 for closing the access opening 14 having a generally circular shape. The vessel 12, as is typical with cryogenic storage vessels, includes a inner shell 18 spaced from an outer shell 20 which forms a chamber 22 therebetween. Typically, the chamber 22 is evacuated so as to insulate the inner shell from the outer shell.

The foregoing is only an example of a cryogenic vessel, it being understood that the vessel 12 may take any other type constructions as desired. In the embodiment illustrated, the vessel is provided with a pair of handles 24 for lifting and moving the vessel as desired.

The cover 16 includes a bottom mating surface designed to engage the outer surface 28 of the outer shell adjacent the cover 16. Adjacent the access opening 14 and mating cover 16, there is provided an insulating block 30 which projects down into the interior of cryogenic chamber 15. Preferably, as illustrated, the insulating block 30 has an outer configuration which corresponds with the inner configuration of access opening 14. The insulating block 30 as illustrated has a substantially cylindrical configuration. However, it is to be understood that the insulating block may take other configurations as desired so as to conform to the appropriate configuration of the mating access opening 14. The insulating block 30 is provided with a recess opening 34 which extends from the central area of the insulating block toward the bottom surface 36 of the insulating block such that the recess opening is directed toward the surface of the cryogenic liquid placed within the interior chamber 15. In the particular embodiment illustrated, the recess opening 34 comprises a substantially cylindrical configuration. At the bottom of the recess opening 34 there is secured an ultrasonic transducer 38. In the particular embodiment illustrated, transducer 38 is pressed into a transducer holder which is secured to block 30 by epoxy cement. The ultrasonic transducer 38 is positioned such that the ultrasonic waves that it produces is directed in a substantially perpendicular direction to the surface of the cryogenic liquid placed within the vessel 12. In the particular embodiment illustrated, this results in the ultrasonic transducer being directed directly downward toward the bottom of the vessel. The material which insulation block 30 is made from is selected so as to minimize any potential thermal shock that may occur to the ultrasonic transducer 38. In the particular embodiment illustrated, the insulating block 30 is made of high density closed cell polystyrene having a density of 2 lb./cu.ft. having a height H of about 8 inches, and a diameter D of about 6-8 inches (15.24 cm-20.3 cm). The recess opening 39 has a length 1 of about 3.25 inches (8.25 cm) and a diameter D of about 1¼ inches (3.175 cm). The diameter of the recess opening 34 is designed to be as small as possible, yet sufficiently large to allow appropriate ultrasonic signals to be transmitted and received back to the transducer 38. The extremely harsh cryogenic environment presented by the cryogenic vessel 12 requires the transducer to be as durable as possible. Applicants have found that a Teflon encased, ceramic epoxy transducer produced and sold by Parohs-Sonics, Inc. under the model number 2007T provides appropriate durability in the desired environment.

The ultrasonic transducer 38 is electrically connected to a control unit 40 secured to the outside surface of the cover 16 by wire 37. The control unit 40 is electrically connected to an appropriate source of electricity by electrical cord 41. The control unit includes the appropriate electronic circuitry to provide signals to the ultrasonic transducer and receive the appropriate signals from ultrasonic transducer and translating such information into the appropriate indication of the level of the cryogenic liquid.

Figure 6:
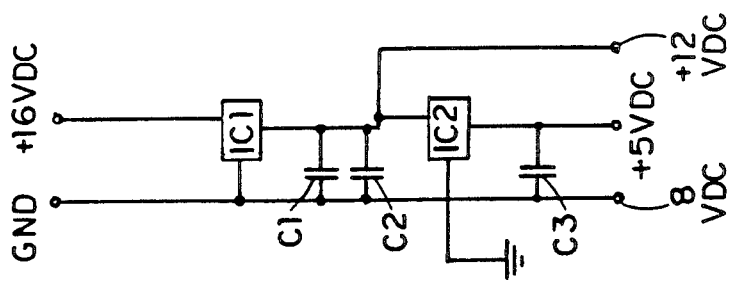
FIGS. 6, 7 and 7A illustrate a schematic circuit diagram of a specific embodiment of the invention shown on two sheets of drawings, points A,B,C, being common to FIGS. 7 and 7A.
Figure 7:
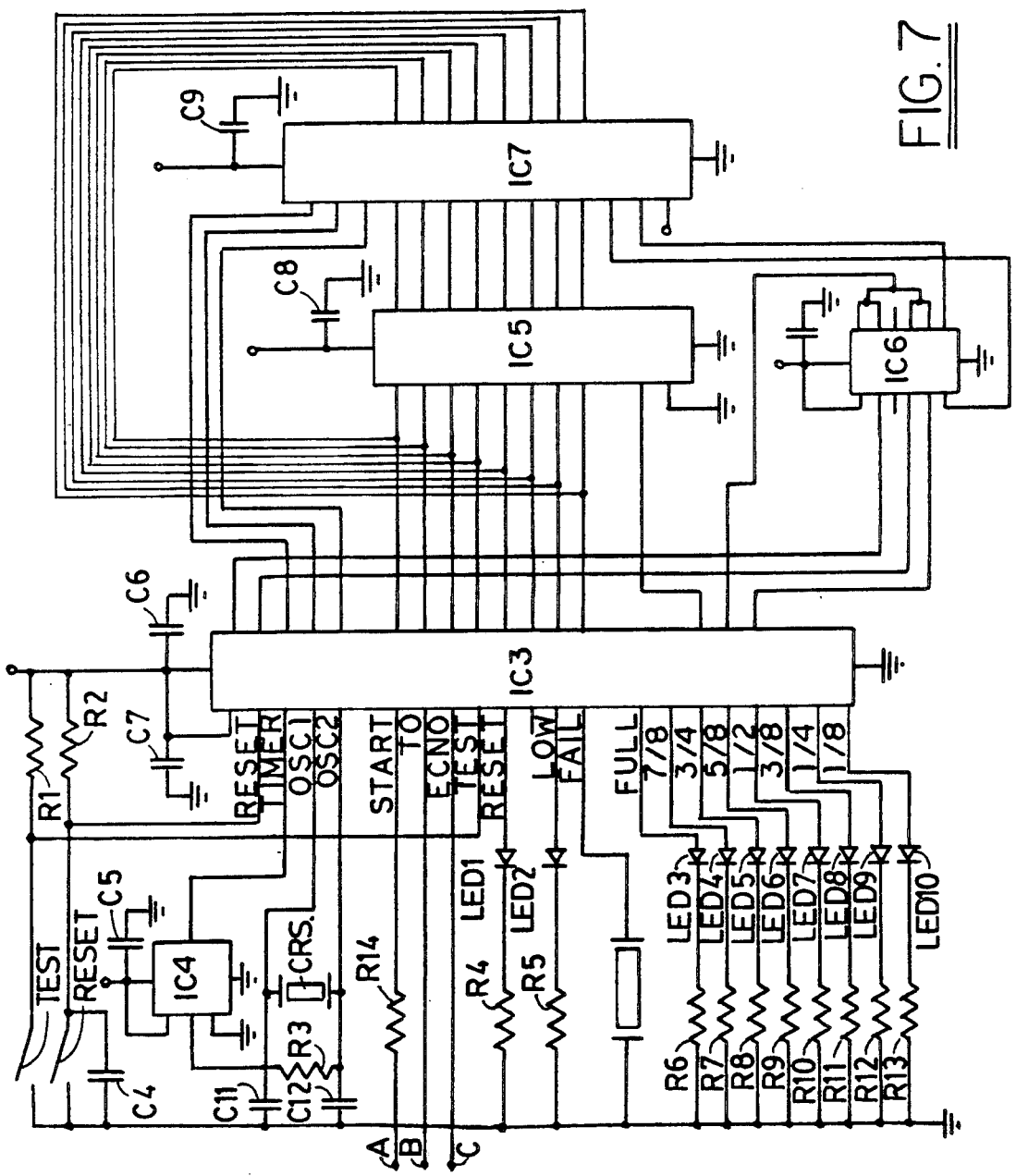
Figure 7A:
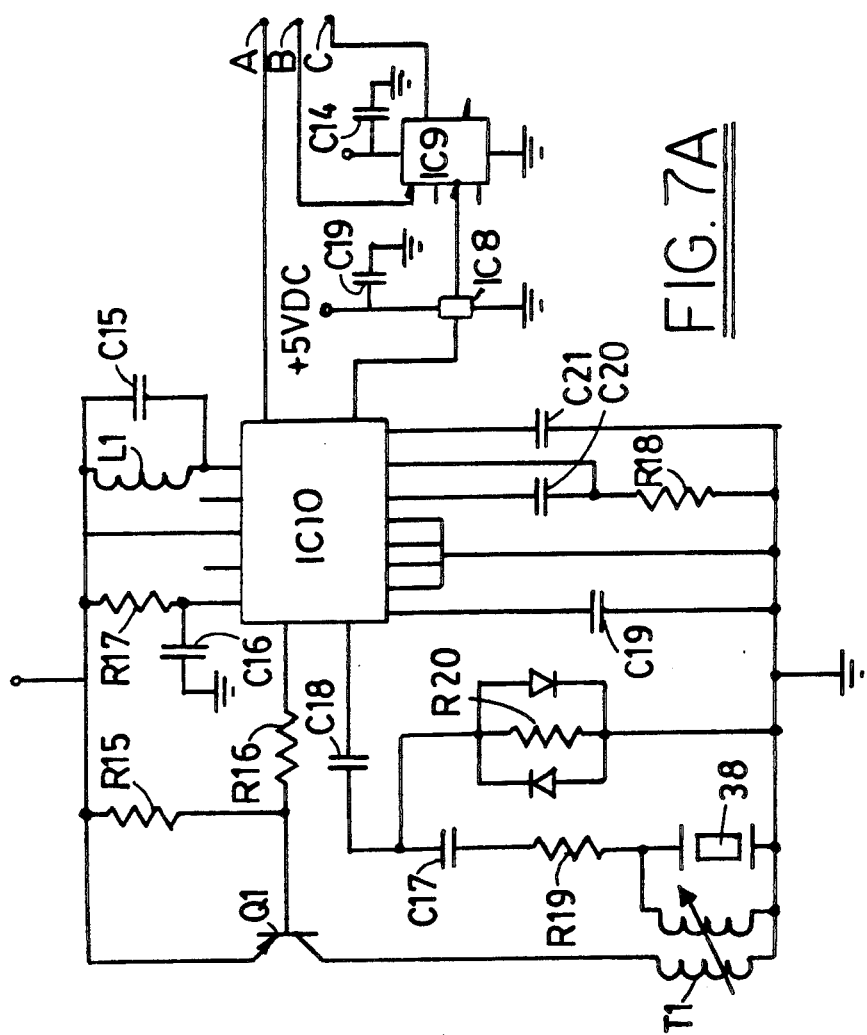

Referring to FIGS. 6, 7 and 7A, there is illustrated an electrical schematic of the electronics within the control unit 40. Electrical cord 41 goes to a power supply 42 (see FIG. 1) which provides power to the control unit 40. Internal voltage regulators IC1 and IC2 provide 12 volt and 5 volt DC power for analog and digital circuitry, respectively. A microprocessor IC3 is provided and configured to run continuously by means of +5 volts continuous on its RESET line. An oscillator is provided through the use of a 2.097152 Mhz. crystal, resistor R3 and capacitors C11 and C12. The oscillator provides internal clocking for all IC3 functions via OSC1 and OSC2. An integrated circuit IC4 divides the crystal frequency to 1 Hz., providing a real 1 second time base to microprocessor IC3 via the timer line.

Integrated circuit IC5 is an address latch to de-multiplex the microprocessors IC3 multiplex address/database bus. Integrated circuit IC6 provides address decoding to enable EPROM IC7 to transfer permanently stored instruction to the microprocessor for the aid to control the operation of the level indication system.

Actuating the normal reset switch 56 on control unit 40 (See FIG. 4) pulls the RESET line low and initializes all time in a temporary memory in the microprocessor IC3. This puts the microprocessor IC3 in a wait state. The microprocessor IC3 provides power to illuminate a light emitting diode 57 in control unit 40 during this condition. If the switch 56 is left on for 5 minutes, the microprocessor IC3 intermittently sounds an audio alarm 58 provided in control unit 40. This alerts the user that the system is not set for normal indication. Normally, the reset switch 56 is actuated only when the cover 16 is removed and alarm 58 alerts the user to put the cover back on the vessel 12.

Upon release of the reset switch 56, the microprocessor IC3 clocks the transducer control integrated circuit IC10 with a high pulse on the START line. Integrated circuit IC10 in turn excites the transmitter in the ultrasonic transducer 38 by means of resistors R15, R16, Q1 and T1 at a frequency of 200 Khz. which are tuned by L1 and capacitor C15.

After an initial time delay, to eliminate the spurious effects of transducer ringing, the IC3 begins incrementing an internal counter at a precise internal generated frequency until a high level is detected on the ECHO input line. This ECHO condition is generated as a result of the ultrasonic energy reflected off the surface of the liquid of the cryogenic liquid exciting the receiver integrated in the ultrasonic transducer. This return signal is transmitted through R19, C17 and C18 to IC10. IC10, which in turn, triggers flip-flop IC9 to produce the ECHO pulse. IC8 simply shifts the voltage level from 12 to 5 volts, providing an interface for the analog to digital circuitry. The internal counter is stopped when the ECHO line transition is detected. Its content represents the time for the sound to travel from the transducer to the liquid surface and back again, or a distance of 2d. Using the relationship:

VESSEL LEVEL=FULL VESSEL DEPTH−d

Figure 4:
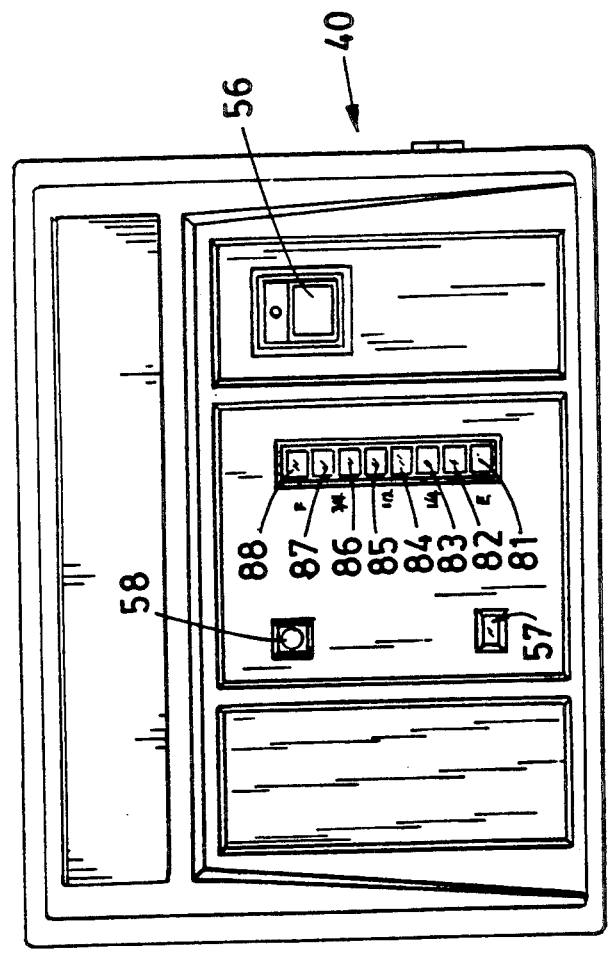
FIG. 4 is a top plan view of the control unit of the apparatus of FIGS. 1-4.

A value for the tank level can be computed from the value stored in the counter. For every container of a particular geometry there is a particular set of values of echoed time periods that is representative of the level of cryogenic liquid therein. Constants stored in memory are representative of liquid level for that container of a known geometry. These values are predetermined experimentally using the level detector of the present invention and are compared to the liquid level depth as measured by other means, thus allowing the geometry of a table of values representative of the liquid level for a particular container of known geometry. The values are permanently stored in Read-Only memory in a table. Thus, by comparing computed values to constants stored in memory which characterize the geometry of the particular vessel being used, the IC3 then can display actual vessel level by illuminating the appropriate light-emitting diode in array of LED 3-10 provided as illustrated in FIG. 4 by numerals 81, 82, 83, 84, 85, 86, 87 and 88. Alternatively, if desired, the level sensing value could be used to actually provide a digital readout using a 7 segment LED or LCD-type display unit.

The level indication is refreshed every 3 minutes inasmuch as the evaporation rate under normal conditions is very low.

Software filtering is employed so as to provide a very stable continuum of level indications. This eliminates unstable indications that might result from transient physical conditions in the liquid or transient electrical conditions in the analog circuitry. For example, if the vessel 12 is moved or jarred, an alarm will not go on until an appropriate time period has passed. It is well within those of ordinary skill in the art to provide the appropriate programming to accomplish such filtering.

The system also contains a stability detection algorithm. If successive readings of the level of the cryogenic liquid are not consistent within certain tolerances, this routing directs the microprocessor IC3 to flash all 8 of the level indication LEDs simultaneously, thus alerting the user of a fault in the transducer and/or associated analog circuitry.

Upon determination that the level of cryogenic liquid is within 2 inches of the bottom of the vessel, another program causes the microprocessor IC3 to illuminate LED2, alerting the user of a low level indication. Upon determination that the level liquid is within 1 inch of the bottom of the vessel, another software routinely enables the microprocessor IC3 to intermittently energize LED 1 and the audio alarm 58, alerting the user to this "empty" condition.

The system also incorporates an algorithm that monitors the rate of evaporation of the liquid in the vessel. If a rate of evaporation of 1 inch/2 hours is detected, the microprocessor IC3 causes the audio alarm 58 to sound continuously, thus alerting the user of a gross system fault, such as a vessel vacuum failure.

A test switch is provided to pull the microprocessor IC3 input line low. When this condition is detected, the microprocessor IC3 automatically sequences through a test routine which turns on all LEDs and the audio alarm 58. This enables checking the integrity of the digital indication systems prior to its use.

It is, of course, understood that various changes and modifications may be made without departing from the spirit and scope of the present invention. For example, conditions under which audio and visual alarms may sound may be selected as desired by the particular user.

What is claimed is:

1. A method for measuring the level of a cryogenic liquid in a preselected cryogenic container of a known geometry, comprising the steps of:

a) transmitting ultrasonic waves using transducer means at said cryogenic liquid within said container, said transducer means being placed within a block of thermal insulation so as to minimize any potential thermal shock, said insulator having a passage for allowing ultrasonic waves to be transmitted and received from said transducer means;

b) monitoring the time interval between the transmitted ultrasonic waves and echoed pulse waves; and c) comparing said time measured with experimentally predetermined time intervals values stored in memory which are characteristic of the level of the cryogenic liquid for said container.

2. A method according to claim 1 further comprising the steps of displaying the value of said level of said cryogenic liquid within said container.

3. A method according to claim 1 further comprising the steps of activating an alarm for warning the operator of an unstable or low condition.

4. A device for measuring the level of a cryogenic liquid in a preselected container of a known geometry comprising:

a) means for transmitting and receiving ultrasonic waves for a duration of time at least equal to time required to travel to the surface and return, said means for transmitting and receiving ultrasonic waves is placed within a block of insulation so as to minimize any potential thermal shock, said insulation having a passage for allowing ultrasonic waves to be transmitted and received from said transducer;

b) measuring means for determining the time interval between the transmitted ultrasonic waves and echoed pulse; and c) means for comparing said time interval measured with a experimentally predetermined stored table of time interval values which are characteristic of the level of a cryogenic liquid in said container.

5. A device according to claim 4 wherein said means for transmitting and receiving said ultrasonic waves is secured to a cover.

6. A device according to claim 4 wherein said means for transmitting and receiving ultrasonic waves is placed within insulation secured to said cover.

7. A device according to claim 4 wherein said means for transmitting and receiving ultrasonic waves comprises a plastic encased ceramic transducer.

8. A device according to claim 7 wherein said transducer is placed within insulation, said insulation having a configuration such that a passageway is formed for allowing said ultrasonic waves to be directed to said liquid.

9. A device according to claim 8 wherein said passageway is substantially cylindrical.

10. A device according to claim 8 wherein said insulation has a thickness of 8 inches and said passageway has a length of 3.25 inches.

11. A device according to claim 4 further comprising means for alerting of the level of said cryogenic liquid becomes unstable, low.

12. A device according to claim 4 further comprising display means for displaying the level of cryogenic liquid within said container.

13. A device for measuring the level of a cryogenic liquid in a preselected cryogenic container of a known geometry comprising:

a) a container vessel for holding a cryogenic liquid, said containment vessel having an access opening;

b) a cover for closing said access opening;
c) transducer means for transmitting and receiving ultrasonic waves for a duration of time at least equal to the time required to travel to the surface and return, said transducer means being placed within a block of insulation so as to minimize any potential thermal shock, said insulator being secured to said cover for placement within said container, said insulator having a passage for allowing ultrasonic waves to be transmitted and received from said transducer means;
d) measuring means for determining the time interval between the transmitted and received ultrasonic waves;
e) means for comparing said time interval measured with a predetermined stored table of time interval values which are characteristic of the level of said cryogenic liquid in said container.

14. A device according to claim 13 wherein said transducer means for transmitting and receiving said ultrasonic waves is secured to a cover.

15. A device according to claim 13 wherein said insulation has a configuration such that a passageway is formed for allowing said ultrasonic waves to be directed to said liquid.

16. A device according to claim 15 wherein said passageway is substantially cylindrical.

17. A device according to claim 15 wherein said insulation has a thickness of 8 inches and said passageway has a length of 3.25 inches.

18. A device according to claim 13 further comprising means for alerting of the level of said cryogenic liquid becomes unstable, low.

19. A device according to claim 13 further comprising display means for displaying the level of cryogenic liquid within said container.

20. A device according to claim 13 wherein said transducer means for transmitting and receiving ultrasonic means comprise a ceramic epoxy transducer.

* * * * *